(12) United States Patent
Tanaka et al.

(10) Patent No.: US 9,279,708 B2
(45) Date of Patent: Mar. 8, 2016

(54) ULTRASONIC FLOWMETER

(71) Applicant: YOKOGAWA ELECTRIC CORPORATION, Musashino-shi, Tokyo (JP)

(72) Inventors: Hiroaki Tanaka, Musashino (JP); Minako Terao, Musashino (JP); Yoshiaki Tanaka, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 14/292,965

(22) Filed: Jun. 2, 2014

(65) Prior Publication Data
US 2014/0366642 A1  Dec. 18, 2014

(30) Foreign Application Priority Data

Jun. 18, 2013  (JP) ................................ 2013-127652

(51) Int. Cl.
*G01F 1/66* (2006.01)
*G01F 25/00* (2006.01)

(52) U.S. Cl.
CPC ............... *G01F 1/662* (2013.01); *G01F 1/667* (2013.01); *G01F 1/668* (2013.01); *G01F 25/0007* (2013.01)

(58) Field of Classification Search
USPC .......................................... 73/861.25–861.31
See application file for complete search history.

(56) References Cited

U.S. PATENT DOCUMENTS

| 4,484,478 | A | * | 11/1984 | Harkonen | G01F 1/667 73/861.06 |
|---|---|---|---|---|---|
| 4,598,593 | A | * | 7/1986 | Sheen | G01F 1/667 73/861.04 |
| 5,228,347 | A | * | 7/1993 | Lowell | G01F 1/667 73/861.27 |
| 5,533,408 | A | * | 7/1996 | Oldenziel | G01F 1/662 73/861.06 |
| 6,065,350 | A | * | 5/2000 | Hill | G01D 5/48 73/861.27 |
| 6,397,683 | B1 | | 6/2002 | Hagenmeyer et al. | |
| 6,595,070 | B1 | * | 7/2003 | Cole | G01F 1/667 73/861.27 |

(Continued)

FOREIGN PATENT DOCUMENTS

| JP | 8-502831 A | 3/1996 |
|---|---|---|
| JP | 3043758 B2 | 5/2000 |

(Continued)

OTHER PUBLICATIONS

Nakamura T et al. "Sound pressure fields focused by aspherical acoustic fresnel lens", 17th International Congress on Sound and Vibration 2010, ICSV 2010, Cairo Jul. 18-22, 2010, vol. 5, 2010, pp. 3664-3671, XP002730762.

(Continued)

*Primary Examiner* — Jewel V Thompson
(74) *Attorney, Agent, or Firm* — Hauptman Ham, LLP

(57) ABSTRACT

An ultrasonic flowmeter includes a plurality of ultrasonic wave elements attached to an outer wall of a pipeline through which a measurement target fluid flows, and configured to transmit and receive an ultrasonic signal, wherein at least one of the ultrasonic wave elements is an ultrasonic wave transmission element and is attached to the outer wall of the pipeline so that an ultrasonic wave transmission surface thereof is in parallel to a pipe axis direction of the pipeline, and another at least one of the ultrasonic wave elements is an ultrasonic wave reception element and is attached to the outer wall of the pipeline so that an ultrasonic wave reception surface thereof is in parallel to the pipe axis direction of the pipeline.

8 Claims, 9 Drawing Sheets

(56) References Cited

U.S. PATENT DOCUMENTS

| | | | | |
|---|---|---|---|---|
| 6,634,239 | B2 * | 10/2003 | Gomm | G01F 1/667 73/861.27 |
| 7,159,472 | B1 | 1/2007 | Hastings et al. | |
| 7,469,599 | B2 * | 12/2008 | Froehlich | G01F 1/66 73/861.27 |
| 7,877,888 | B2 | 2/2011 | Batzinger et al. | |
| 8,174,930 | B2 * | 5/2012 | LaWhite | G01P 5/241 367/90 |
| 8,852,110 | B2 * | 10/2014 | Vilkomerson | A61B 8/06 600/454 |
| 2006/0117867 | A1 | 6/2006 | Froehlich et al. | |
| 2009/0112509 | A1 | 4/2009 | Batzinger et al. | |
| 2011/0132102 | A1 * | 6/2011 | Ueberschlag | G01F 1/663 73/861.27 |
| 2013/0061687 | A1 * | 3/2013 | Rath | G01F 15/14 73/861.25 |
| 2014/0137662 | A1 * | 5/2014 | Heinks | G01F 1/66 73/861.28 |

FOREIGN PATENT DOCUMENTS

| | | |
|---|---|---|
| JP | 2001-304929 A | 10/2001 |
| JP | 2002-318145 A | 10/2002 |
| JP | 2004-520581 A | 7/2004 |
| JP | 2008-267848 A | 11/2008 |
| JP | 2010-276523 A | 12/2010 |
| JP | 2011501191 A | 1/2011 |
| WO | 95/17650 A1 | 6/1995 |
| WO | 02/055966 A2 | 7/2002 |
| WO | 02/055966 A3 | 9/2002 |
| WO | 2008/098101 A2 | 8/2008 |
| WO | 2009055110 A1 | 4/2009 |

OTHER PUBLICATIONS

Hans O Rolfsnes et al: "Spatial redefinition of ultrasound pressure fields using polycarbonate lenses: Model and experimental validation", Ultrasonics Symposium(IUS), 2009 IEEE International, IEEE, Piscataway, NJ, USA, Sep. 20, 2009, pp. 2344-2346, XP031654753, ISBN: 978-1-4244-4389-5.

Jing Liang, Zheng Wang, Yiwei Shi: "Ultrasonic Inspection of Thick Parts With Phased Array Dynamic Focusing", Proceedings of the 10th European Conference on Non-Destructive Testing, Moscow, Jun. 7-11, 2010, XP002730764, Retrieved from the Internet: URL:http://www.ndt.net/article/ecndt2010/reports/1_03_91.pdf [retrieved on Oct. 8, 2014].

* cited by examiner

ULTRASONIC FLOWMETER

CROSS-REFERENCE TO RELATED APPLICATION

This application claims priority from Japanese Patent Application No. 2013-127652 filed with the Japan Patent Office on Jun. 18, 2013, the entire content of which is hereby incorporated by reference.

BACKGROUND

1. Technical Field

The present disclosure relates to an ultrasonic flowmeter.

2. Related Art

A clamp-on type ultrasonic flowmeter has been widely used in various fields for the following reasons, for example. The clamp-on type ultrasonic flowmeter can be installed afterward in the existing pipeline. The clamp-on type ultrasonic flowmeter has a transducer portion for transmitting and receiving ultrasonic signals attached outside the pipeline to prevent pressure loss. The clamp-on type ultrasonic flowmeter can easily measure even corrosive fluid and/or high-pressure fluid.

FIGS. 10A and 10B are diagrams illustrating the structure of an exemplary clamp-on type ultrasonic flowmeter in the related art (refer to, for example, Japanese Patent No. 3043758). Specifically, FIG. 10A is a diagram illustrating the entire structure of the flowmeter, and FIG. 10B is a partial cross-sectional view of a transducer 4 in FIG. 10A. The ultrasonic flowmeter includes a first bracket 3 and a second bracket 5 on the upper part of a pipeline 1 in a pipe axis direction. The first bracket 3 is attached with a first hooded ultrasonic transducer 2, and the second bracket 5 is attached with a second hooded ultrasonic transducer 4. These first and second brackets 3 and 5 are fixed on the pipeline 1 in an axial direction thereof through metal bands 6 and 7, respectively, to maintain a predetermined positional relation therebetween.

As illustrated in FIG. 10B, each of the hooded transducers 2 and 4 houses a base 8 having a predetermined inclined surface on which an ultrasonic transducer 9 is attached.

The ultrasonic flowmeter configured as described above operates as follows. The first ultrasonic transducer 2, which is fixed on the pipeline 1, emits an ultrasonic wave from its ultrasonic transducer in a direction obliquely to the axis of the pipeline 1. The second ultrasonic transducer 4 is slid over the pipeline 1 to find out a suitable position thereof for allowing its ultrasonic transducer to receive the ultrasonic wave most efficiently, followed by being fixed on the resulting position.

FIG. 11 is a diagram illustrating the structure of another exemplary clamp-on type ultrasonic flowmeter in the related art (refer to, for example, JP-T-2011-501191). As illustrated in FIG. 11, the ultrasonic flowmeter 10 includes a plurality of leg portions 14 and a dial gauge 15. The leg portions 14 are disposed with spaces therebetween and are in contact with an outer peripheral surface 13 of a predetermined portion 12 of a pipe 11. The dial gauge 15 is disposed between the leg portions 14. The dial gauge 15 is configured to indicate the radius of curvature at each of a plurality of positions measured from a measurement reference point in a circumferential direction along the outer peripheral surface 13. The curvature radius data at the positions, which are measured by the dial gauge 15, and the thickness data of the pipe, which are measured separately, are transmitted to a processor 16. These data are used, for example, in calculation to determine the horizontal cross-sectional area of the predetermined portion 12 of the pipe 11.

SUMMARY

An ultrasonic flowmeter includes a plurality of ultrasonic wave elements attached to an outer wall of a pipeline through which a measurement target fluid flows, and configured to transmit and receive an ultrasonic signal, wherein at least one of the ultrasonic wave elements is an ultrasonic wave transmission element and is attached to the outer wall of the pipeline so that an ultrasonic wave transmission surface thereof is in parallel to a pipe axis direction of the pipeline, and another at least one of the ultrasonic wave elements is an ultrasonic wave reception element and is attached to the outer wall of the pipeline so that an ultrasonic wave reception surface thereof is in parallel to the pipe axis direction of the pipeline.

DETAILED DESCRIPTION

Figure 1:
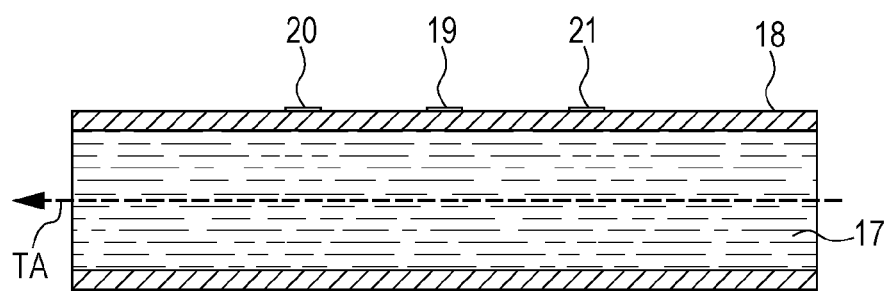
FIG. 1 is a diagram illustrating an exemplary structure of a clamp-on type ultrasonic flowmeter according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the measurement apparatus disclosed in Japanese Patent No. 3043758, when the ultrasonic transducers 2 and 4 are installed on the pipeline 1, the ultrasonic transducers 2 and 4 are slid over the pipeline 1 to find out the optimum positions of the ultrasonic transducers 2 and 4.

On the other hand, the measurement system disclosed in JP-T-2011-501191 conducts additional work to measure the thickness and the radius of curvature of the pipe in advance in order to obtain the flow rate.

An object of the present disclosure is to achieve a clamp-on type ultrasonic flowmeter that can be relatively easily installed on the pipeline.

An ultrasonic flowmeter according to a first aspect of the present disclosure includes a plurality of ultrasonic wave elements attached to an outer wall of a pipeline through which a measurement target fluid flows, and configured to transmit and receive an ultrasonic signal, wherein at least one of the ultrasonic wave elements is an ultrasonic wave transmission element and is attached to the outer wall of the pipeline so that an ultrasonic wave transmission surface thereof is in parallel to a pipe axis direction of the pipeline, and another at least one of the ultrasonic wave elements is an ultrasonic wave reception element and is attached to the outer wall of the pipeline so that an ultrasonic wave reception surface thereof is in parallel to the pipe axis direction of the pipeline.

An ultrasonic flowmeter according to a second aspect of the present disclosure is the ultrasonic flowmeter according to the first aspect, wherein the ultrasonic wave transmission element includes an acoustic lens.

An ultrasonic flowmeter according to a third aspect of the present disclosure is the ultrasonic flowmeter according to the first aspect, wherein the ultrasonic wave transmission element is a phased array element.

An ultrasonic flowmeter according to a fourth aspect of the present disclosure is the ultrasonic flowmeter according to any of the first to third aspects, wherein the ultrasonic wave element has flexibility.

An ultrasonic flowmeter according to a fifth aspect of the present disclosure is the ultrasonic flowmeter according to the fourth aspect, wherein the ultrasonic wave reception surface of the ultrasonic wave element is flat.

An ultrasonic flowmeter according to a sixth aspect of the present disclosure is the ultrasonic flowmeter according to any of the first to fifth aspects, wherein the ultrasonic wave transmission element and two ultrasonic wave reception elements disposed to sandwich the ultrasonic wave transmission element are disposed in the pipe axis direction.

An ultrasonic flowmeter according to a seventh aspect of the present disclosure is the ultrasonic flowmeter according to any of the first to sixth aspects, further including an integrating member for fixing a relative positional relation among the plurality of ultrasonic wave elements.

An ultrasonic flowmeter according to an eighth aspect of the present disclosure is the ultrasonic flowmeter according to any of the first to seventh aspects, further including a self-calibration unit configured to calculate a travel distance of the measurement target fluid in the pipe axis direction and sound velocity of the fluid based on the ultrasonic signal traveling in a direction perpendicular to the pipe axis direction of the pipeline.

An ultrasonic flowmeter according to a ninth aspect of the present disclosure is the ultrasonic flowmeter according to the eighth aspect, further including a flow rate measurement calculation unit configured to calculate a flow rate of the measurement target fluid using a calculation result of the self-calibration unit.

Thus, the clamp-on type ultrasonic flowmeter that can be relatively easily installed on the pipeline can be achieved.

An embodiment of the present disclosure is hereinafter described in detail with reference to the drawings. FIG. 1 is a diagram illustrating an exemplary structure of an ultrasonic flowmeter according to an embodiment of the present disclosure. FIG. 1 illustrates the section of a pipeline in an axial direction of the pipeline (hereinafter, simply referred to as a pipe axis direction) TA. As illustrated in FIG. 1, a plurality of ultrasonic wave elements 19 to 21 for transmitting and receiving ultrasonic signals is disposed in the pipe axis direction TA on the top of an outer wall of a pipeline 18 through which a measurement target fluid 17 flows. The ultrasonic wave elements 19 to 21 are disposed in a predetermined positional relation so that the ultrasonic wave transmission and reception surfaces thereof (ultrasonic wave transmission surfaces or ultrasonic wave reception surfaces) are in parallel to the pipe axis direction TA.

The ultrasonic wave element 19 may be, for example, an ultrasonic wave transmission element including an ultrasonic wave transmission surface. The ultrasonic wave elements 20 and 21 may be two ultrasonic wave reception elements each including an ultrasonic wave reception surface, which are disposed to sandwich the ultrasonic wave transmission element 19 therebetween. The distance between the ultrasonic wave transmission element 19 and the ultrasonic wave reception element 20 may be equal to or substantially equal to the distance between the ultrasonic wave transmission element 19 and the ultrasonic wave reception element 21.

Figure 2:
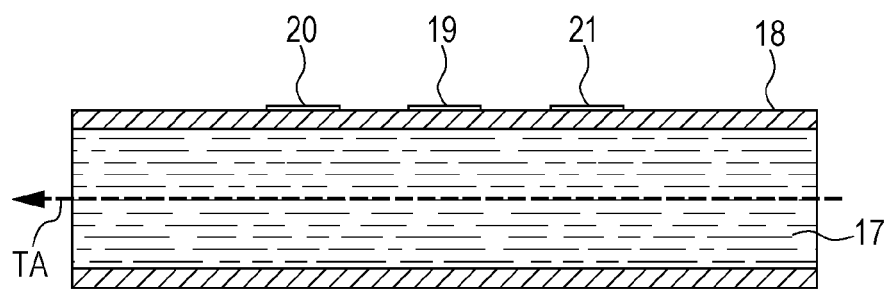
FIG. 2 is diagram illustrating another exemplary structure of the clamp-on type ultrasonic flowmeter according to the embodiment of the present disclosure.

FIG. 2 is diagram illustrating another exemplary structure of the ultrasonic flowmeter according to the embodiment of the present disclosure. In this example, the ultrasonic wave elements 19 to 21 have flexibility. Since the ultrasonic wave elements 19 to 21 have flexibility, the ultrasonic wave elements 19 to 21 can be wound around a desired part of the pipeline 18. The ultrasonic wave elements 19 to 21 have their respective flat surfaces (hereinafter, referred to as element surfaces). Therefore, the ultrasonic wave elements 19 to 21 can employ their larger surfaces to transmit and receive ultrasonic waves. Such configurations of the respective ultrasonic wave elements 19 to 21 allow the ultrasonic flowmeter to suppress the attenuation of the reception signal, leading to more accurate measurement of flow rate.

Any of the ultrasonic wave elements 19 to 21 may be a polyvinylidene fluoride (PVDF) element having broadband frequency characteristics. In this case, the repetition frequency appears also in the high frequency band even when an ultrasonic resonance method in self-calibration is used. This enables the more accurate measurement of the thickness of the pipeline 18 and the velocity of the fluid.

Figure 3A:
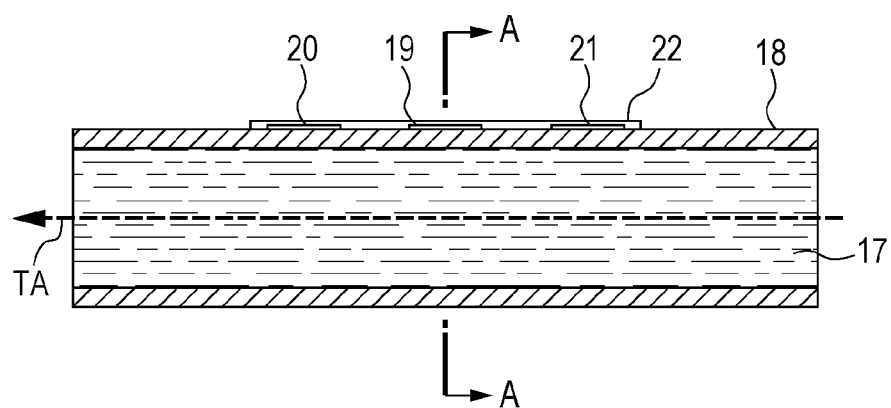
FIGS. 3A and 3B are diagrams illustrating another exemplary structure of the clamp-on type ultrasonic flowmeter according to the embodiment of the present disclosure.
Figure 3B:
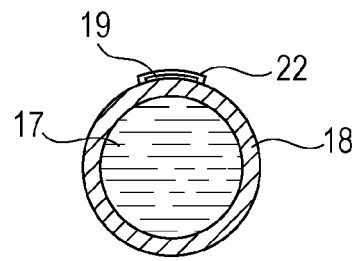

FIGS. 3A and 3B are diagrams illustrating another exemplary structure of the ultrasonic flowmeter according to the embodiment of the present disclosure. In this example, an integrating member 22 is provided to fix a relative positional relation among the ultrasonic wave elements 19 to 21. This eliminates the need to adjust the attachment positions of the ultrasonic transducers 2 and 4, which serve as the ultrasonic wave transmission element and reception element, on the pipeline 1 as disclosed in Japanese Patent No. 3043758. As a result, the efficiency in the attachment work is improved.

Figure 4A:
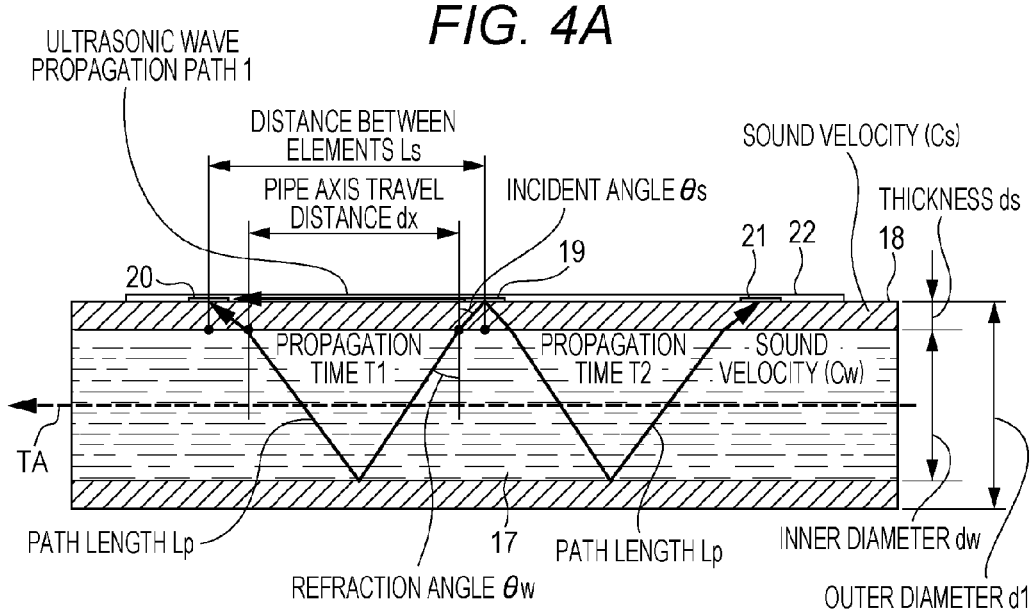
FIGS. 4A and 4B are diagrams illustrating the measurement operation of an ultrasonic flowmeter according to an embodiment of the present disclosure.
Figure 4B:
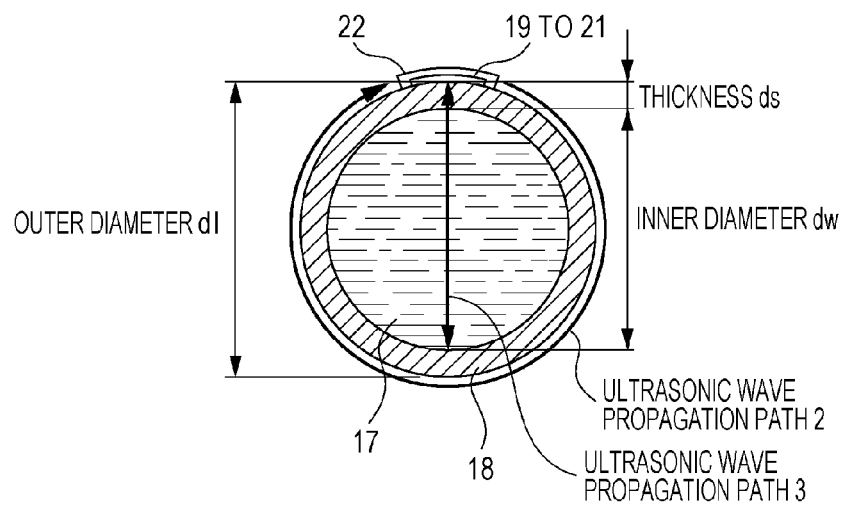
Figure 5A:
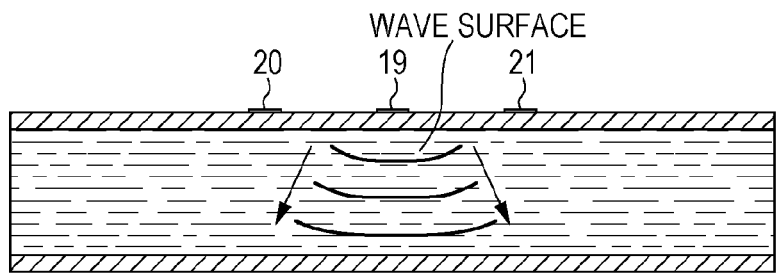
FIGS. 5A to 5F are diagrams illustrating the propagation state of an ultrasonic signal propagating while expanding in fluid.
Figure 5B:
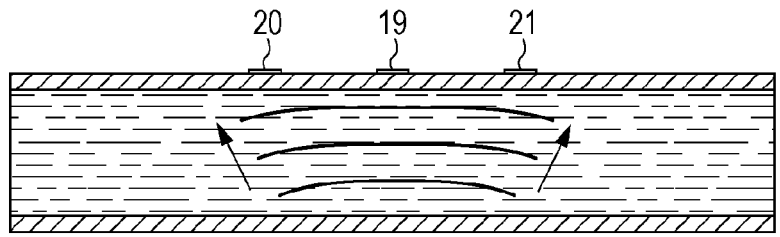
Figure 5C:
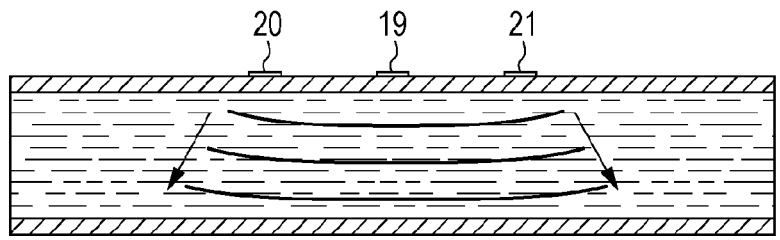
Figure 5D:
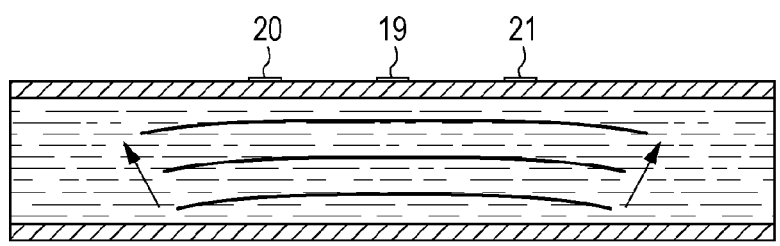
Figure 5E:
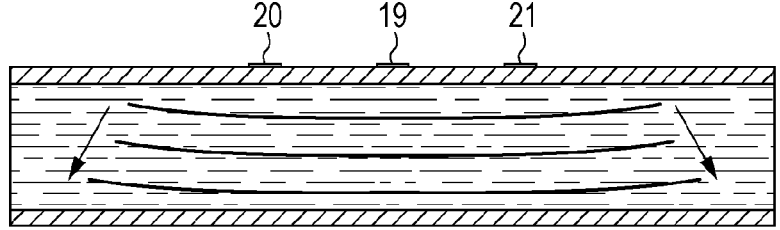
Figure 5F:
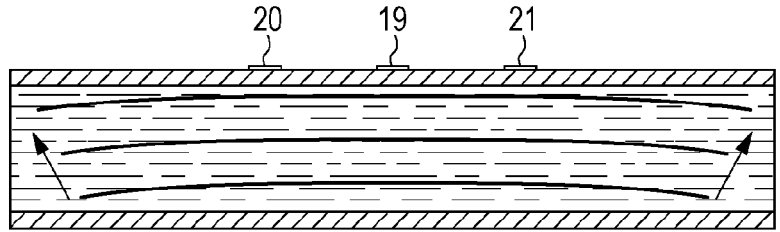

FIGS. 4A and 4B are diagrams illustrating the measurement operation of an ultrasonic flowmeter according to an embodiment of the present disclosure. In FIG. 4A, "dx" represents the travel distance of a fluid 17 in the pipeline 18 in the pipe axis direction (pipe axis travel distance), "F" represents the velocity of the fluid 17, and "Cw" represents the sound velocity of the fluid 17. "θw" represents the incident angle from the fluid to the pipeline 18. In this case, the difference $\Delta T$ between the ultrasonic wave propagation time T1 on the upstream side and the ultrasonic wave propagation time T2 on the downstream side is obtained as follows:

$$T1 = \frac{L_p}{C_w - F\sin\theta_w} \quad (1)$$

$$T2 = \frac{L_p}{C_w + F\sin\theta_w}$$

$$\Delta T = T1 - T2$$

$$= \frac{L_p}{C_w - F\sin\theta_w} - \frac{L_p}{C_w + F\sin\theta_w}$$

$$= \frac{2L_p \sin\theta_w}{C_w^2 - F^2 \sin^2\theta_w} F$$

$$C_w^2 \gg F^2 \sin^2\theta_w \delta\eta$$

$$\Delta T \approx \frac{2L_p \sin\theta_w}{C_w^2} F = \frac{2d_x}{C_w^2} F$$

Therefore, the velocity of the fluid 17 can be obtained by calculating the travel distance dx of the fluid 17 in the pipe axis direction and the sound velocity Cw of the fluid 17 by the self-calibration to be described below. This self-calibration can be automatically conducted when the flowmeter is installed. In this case, there is no need for complicated work for measuring the size and the thickness of the pipe in advance as described in JP-T-2011-501191. After the ultrasonic flowmeter is installed, this self-calibration can be performed inline to improve the long-term measurement stability.

In the self-calibration, the sound velocity Cs of the pipeline 18, the sound velocity Cw of the fluid, and the outer diameter dl, the inner diameter dw, and the thickness ds of the pipeline 18 illustrated in FIG. 4A are obtained from the propagation time and the frequency spectrum of the ultrasonic wave. The sound velocity Cs of the pipeline 18 is obtained from the distance Ls between the transmission and reception elements and the propagation time T1 and T2 using the ultrasonic signal transmitting along the pipe wall through an ultrasonic wave propagation path 1, as illustrated in FIG. 4A.

As illustrated in FIG. 4B, an ultrasonic wave propagation path 2 is the path for the ultrasonic signal travelling around the outer periphery of the pipeline 18. An ultrasonic wave propagation path 3 is the path for the ultrasonic signal reciprocating by reflecting on the inner wall of the pipeline 18. The length of the outer periphery of the pipeline 18 is obtained from the propagation time of the ultrasonic wave propagation path 2 and the sound velocity Cs. Thus, the outer diameter dl of the pipeline 18 is obtained. The thickness ds of the pipeline 18 can be obtained by the ultrasonic resonance method.

In other words, the thickness ds of the pipeline 18 is obtained by ds=Cs/2f based on the sound velocity Cs and the repetition frequency f that appears in the frequency spectrum of the ultrasonic wave passing along the ultrasonic wave propagation path 3 illustrated in FIG. 4B. The inner diameter dw is obtained by dw=dl−2ds based on the outer diameter dl and the thickness ds obtained in advance.

The propagation time Td of the ultrasonic wave propagation path 3 is represented by the following expression (2):

$$T_d = \frac{2d_s}{C_s} + \frac{2d_w}{C_w} \quad (2)$$

Therefore, the sound velocity Cw of the fluid can be obtained from the inner diameter dw, the thickness ds, and the sound velocity Cs of the pipeline 18 obtained in advance.

Thus, the sound velocity Cs of the pipeline 18, the sound velocity Cw of the fluid, and the outer diameter dl, the inner diameter dw, and the thickness ds of the pipeline 18 can be obtained.

Next, the pipe axis travel distance dx of FIG. 4A is obtained. Here, the distance Ls between the transmission and reception elements is represented by the following expression (3):

$$L_s = 2d_s \tan\theta_s + 2d_w \tan\theta_w \quad (3)$$

Moreover, the following expression (4) is derived from the Snell's law:

$$\frac{\sin\theta_s}{\sin\theta_w} = \frac{C_s}{C_w} \quad (4)$$

From the above expressions (3) and (4), the incident angle θw is obtained. Therefore, the pipe—axis travel—distance dx can be obtained by the following expression:

$$d_x = 2d_w \tan\theta_w$$

In this manner, the pipe—axis travel—distance dx and the sound velocity Cw of the fluid are obtained by the self-calibration. Therefore, the velocity of the fluid can be finally obtained from the expression (1).

When the flow rate correction coefficient is K and the sectional area of the pipeline 18 is S, the flow rate V is obtained by the following expression:

$$V = KSF = \pi K \left(\frac{d_w}{2}\right)^2 F \quad (5)$$

Thus, the flow rate V is obtained.

FIGS. 5A to 5F are diagrams illustrating the propagation state of the ultrasonic signal propagating while expanding in the fluid. The ultrasonic wave delivered from the ultrasonic wave transmission element 19 enters the fluid and expands spherically. While repeating the reflection on the inner wall of the pipeline 18, the ultrasonic wave expands toward the upstream and downstream sides of the pipeline 18 and reaches the ultrasonic wave reception elements 20 and 21. As the number of times of reflection increases, the shape of the wave surface changes from the spherical shape to the planar shape as illustrated in FIGS. 5A to 5F.

Figure 6A:
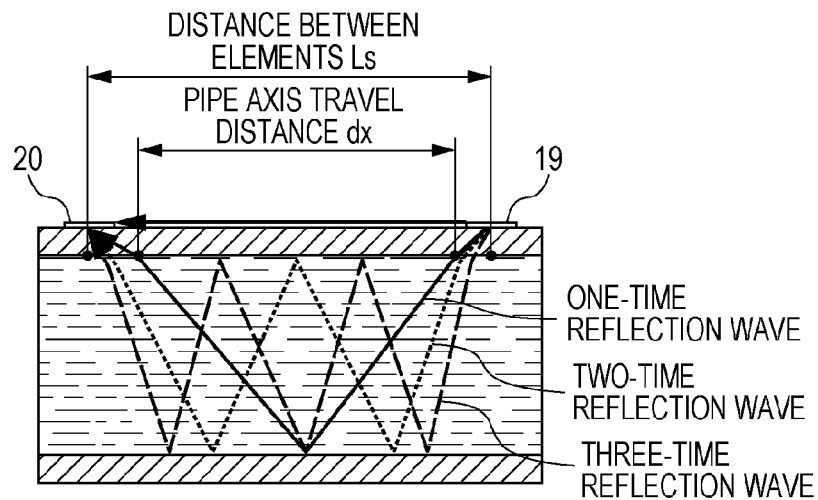
FIGS. 6A and 6B are diagrams illustrating the propagation state of an ultrasonic signal propagating while reflecting a plurality of times in fluid.

FIG. 6A is a diagram illustrating the propagation state of the ultrasonic signal that propagates while reflecting a plurality of times in the fluid. This drawing indicates that as the number of times of reflection increases, the traveling direction of the ultrasonic wave gets closer to the direction perpendicular to the pipe axis. The pipe axis travel distance dx of the ultrasonic wave traveling in the fluid, which is illustrated in FIG. 6A, gets closer to the distance Ls between the transmission and reception elements as the number of times of reflection increases. In other words, as the number of times of reflection increases, the sensitivity of the velocity of fluid gets closer to the sensitivity obtained by the general ultrasonic flowmeter of oblique radiation as indicated by the expression (1). This enables the measurement at the accuracy equal to the accuracy of a general case in which the element surface is installed oblique to the pipe axis.

Figure 6B:
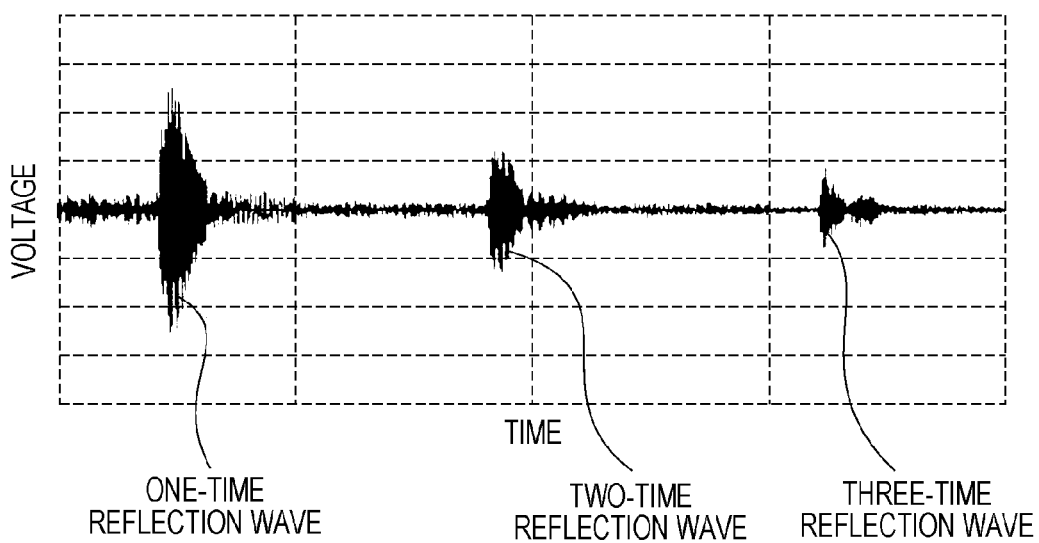

FIG. 6B is a diagram illustrating an example of the reception waveform of a plurality of reflection waves each having a different number of times of reflection. As the number of times of reflection increases like one, two, and three times, the voltage amplitude is reduced.

Figure 7:
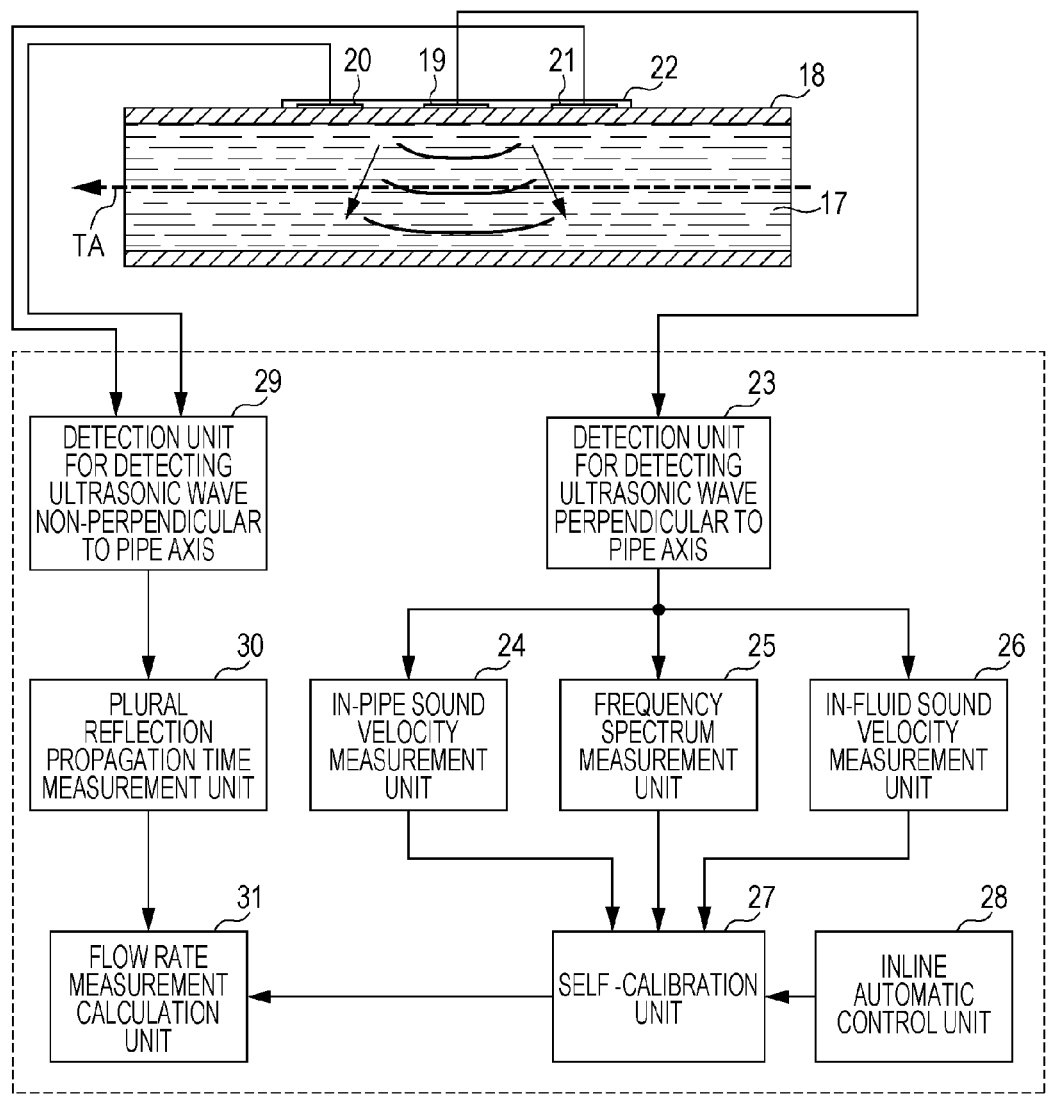
FIG. 7 is a block diagram illustrating an exemplary entire configuration of an ultrasonic flowmeter according to an embodiment of the present disclosure.

FIG. 7 is a block diagram illustrating the entire configuration of an ultrasonic flowmeter according to an embodiment of the present disclosure. A detection unit 23 for detecting an ultrasonic wave perpendicular to the pipe axis takes in the ultrasonic signal perpendicular to the pipe axis of the pipeline 18. The ultrasonic signal is detected by the ultrasonic wave element 19 whose transmission and reception functions can be switched. The detection unit 23 for detecting an ultrasonic wave perpendicular to the pipe axis outputs this signal to an in-pipe sound velocity measurement unit 24, a frequency spectrum measurement unit 25, and an in-fluid sound velocity measurement unit 26.

The in-pipe sound velocity measurement unit 24, the frequency spectrum measurement unit 25, and the in-fluid sound velocity measurement unit 26 output their calculation results (process results) to a self-calibration unit 27 controlled by an inline automatic control unit 28. For example, the in-pipe sound velocity measurement unit 24 may calculate the sound velocity Cs of the pipeline 18. For example, the in-pipe sound velocity measurement unit 24 may acquire the propagation time T1 of the ultrasonic wave on the upstream side by the output signal from the ultrasonic wave element 20. Moreover, the in-pipe sound velocity measurement unit 24 may acquire the propagation time T2 of the ultrasonic wave on the downstream side by the output signal from the ultrasonic wave element 21. Moreover, for example, the frequency spectrum measurement unit 25 may calculate the outer diameter dl, the inner diameter dw, and the thickness ds of the pipeline 18. Moreover, for example, the in-fluid sound velocity measurement unit 26 may calculate the sound velocity Cw of the fluid. The self-calibration unit 27 performs the above self-calibration calculation based on the output signals of the in-pipe sound velocity measurement unit 24, the frequency spectrum measurement unit 25, and the in-fluid sound velocity measurement unit 26 (for example, signals including the calculation results of the sound velocity Cs of the pipeline 18, the sound velocity Cw of the fluid, and the outer diameter dl, the inner diameter dw, and the thickness ds of the pipeline 18), and outputs the calculation results to a flow rate measurement calculation unit 31. For example, the self-calibration unit 27 may calculate the travel distance of the fluid 17 in the pipe axis direction (pipe axis travel distance) dx and the sound velocity Cw of the fluid 17, and output the calculation results to the flow rate measurement calculation unit 31.

A detection unit 29 for detecting an ultrasonic wave non-perpendicular to the pipe axis takes in an ultrasonic signal that is not perpendicular to the pipe axis of the pipeline 18. The ultrasonic signal is detected by the ultrasonic wave elements 20 and 21, and the detection unit 29 outputs the signal to a plural reflection propagation time measurement unit 30. The plural reflection propagation time measurement unit 30 outputs the calculation result to the flow rate measurement calculation unit 31. The flow rate measurement calculation unit 31 calculates and outputs the flow rate of the fluid flowing through the pipeline 18 based on the calculation results of the self-calibration unit 27 and the plural reflection propagation time measurement unit 30. For example, the plural reflection propagation time measurement unit 30 may calculate the propagation time Td of the ultrasonic wave propagation path 3 with the expression (2). The flow rate measurement calculation unit 31 may calculate the velocity of the fluid with the expression (1) and calculate the flow rate V with the expression (5).

In the ultrasonic flowmeter according to the embodiment of the present disclosure, the ultrasonic wave transmission element and the ultrasonic wave reception element are integrated together to eliminate the need for positional adjustment relative to the pipeline 1, which has been necessary in the clamp-on type ultrasonic flowmeter in the related art. Therefore, the above elements can be more easily attached to the pipeline.

In the ultrasonic flowmeter according to the embodiment of the present disclosure, the self-calibration is performed. This eliminates the need to measure the pipe size and the like before the flowmeter is installed. This can reduce the number of steps in the attachment work.

Moreover, in the ultrasonic flowmeter according to the embodiment of the present disclosure, the inline automatic control unit 28 can control the self-calibration unit 27 to perform the self-calibration regularly. This can maintain and improve the stability in the long-term measurement.

Figure 8:
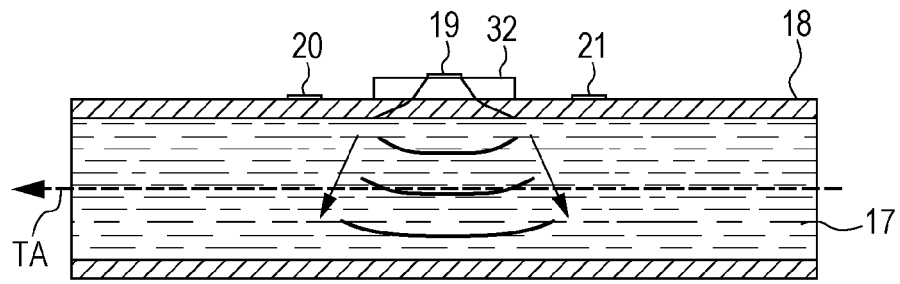
FIG. 8 is a diagram illustrating another exemplary structure of the ultrasonic flowmeter according to the embodiment of the present disclosure.

FIG. 8 is a diagram illustrating another exemplary structure of the ultrasonic flowmeter according to the present embodiment of the present disclosure. As illustrated in FIG. 8, the ultrasonic wave element 19 emitting the ultrasonic wave is attached to the pipeline 18 via an acoustic lens 32 that functions as a member (means) for generating the ultrasonic wave whose traveling direction is not perpendicular to the pipe axis.

Even though the acoustic lens 32 is not used, the ultrasonic wave whose traveling direction is not perpendicular to the pipe axis is generated by the diffusion in the fluid. Furthermore, the acoustic lens 32 can be used to expand the emitted ultrasonic wave. As a result, the signal intensity of the ultrasonic wave whose traveling direction is not perpendicular to the pipe axis can be increased.

Figure 9A:
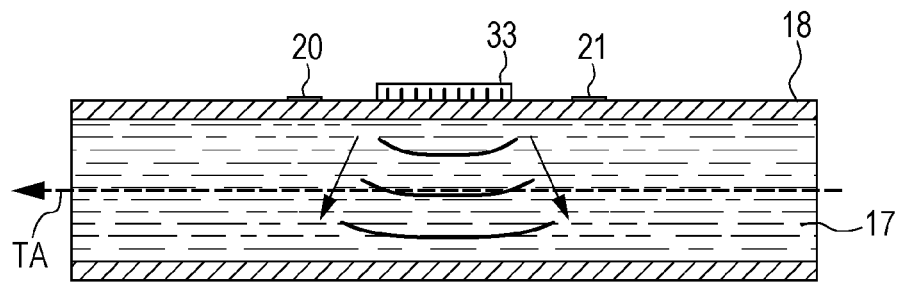
FIGS. 9A and 9B are diagrams illustrating another exemplary structure of the ultrasonic flowmeter according to the embodiment of the present disclosure.
Figure 9B:
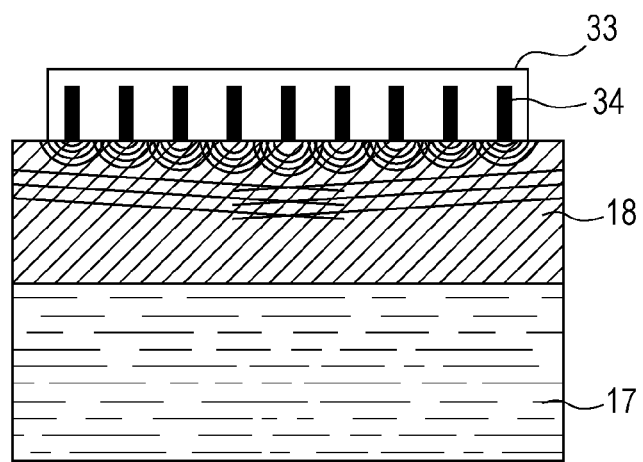
Figure 10A:
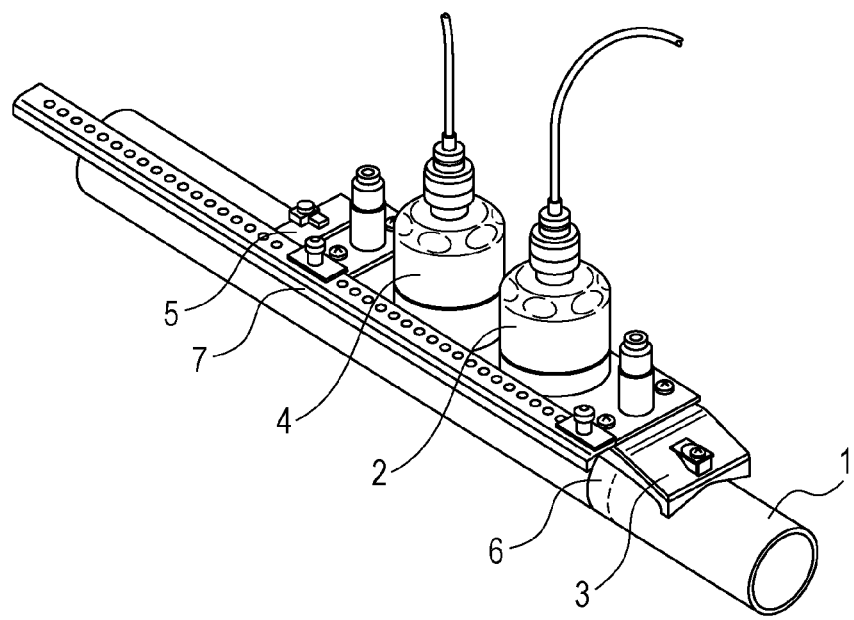
FIGS. 10A and 10B are diagrams illustrating the structure of an exemplary clamp-on type ultrasonic flowmeter in the related art.
Figure 10B:
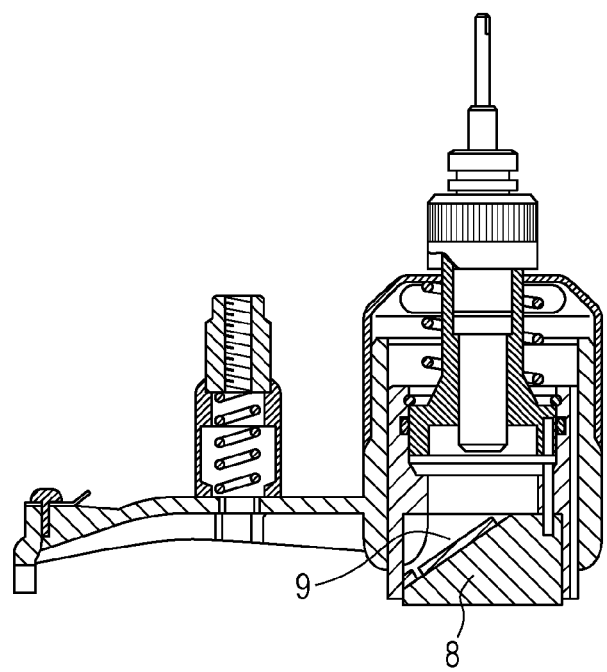
Figure 11:
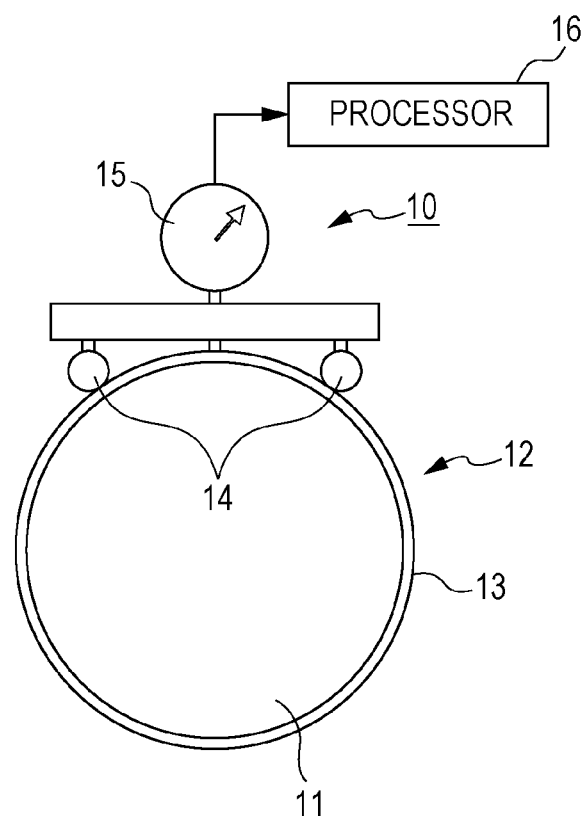
FIG. 11 is a diagram illustrating the structure of another exemplary clamp-on type ultrasonic flowmeter in the related art.

FIGS. 9A and 9B are diagrams illustrating another exemplary structure of the ultrasonic flowmeter according to the embodiment of the present disclosure. FIG. 9A is the entire view and FIG. 9B is a magnified view of a main part. In the example illustrated in FIGS. 9A and 9B, a phased array element 33 is used as a member (means) for generating the ultrasonic wave whose traveling direction is not perpendicular to the pipe axis. The phased array element 33 can be used to appropriately adjust the angle of the emitted wave surface. As a result, the intensity of the ultrasonic wave whose traveling direction is not perpendicular to the pipe axis can be increased.

As thus described, according to the embodiment of the present disclosure, the clamp-on type ultrasonic flowmeter that can be relatively easily installed on the pipeline can be achieved. The ultrasonic flowmeter according to the embodiment of the present disclosure may be any one of the following first to fifth ultrasonic flowmeters.

The first ultrasonic flowmeter is an ultrasonic flowmeter configured to have a plurality of ultrasonic wave units for transmitting or receiving an ultrasonic signal attached to an outer wall of a pipeline through which a measurement target fluid flows, wherein at least one of the ultrasonic wave units is attached as an ultrasonic wave transmission unit so that an ultrasonic wave transmission surface thereof is in parallel to a pipe axis direction of the pipeline; and another at least one of the ultrasonic wave units is attached so that an ultrasonic wave reception surface thereof is in parallel to the pipe axis direction of the pipeline.

The second ultrasonic flowmeter is the first ultrasonic flowmeter wherein the ultrasonic wave transmission unit includes an acoustic lens.

The third ultrasonic flowmeter is the first ultrasonic flowmeter wherein a phased array element is used as the ultrasonic wave transmission unit.

The fourth ultrasonic flowmeter is any one of the first to third ultrasonic flowmeters wherein the ultrasonic wave unit has flexibility.

The fifth ultrasonic flowmeter is any one of the first to fourth ultrasonic flowmeters wherein self-calibration is performed based on an ultrasonic signal traveling in a direction perpendicular to the pipe axis direction of the pipeline.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An ultrasonic flowmeter comprising a plurality of ultrasonic wave elements attached to an outer wall of a pipeline through which a measurement target fluid flows, and configured to transmit and receive an ultrasonic signal, wherein
   at least one of the ultrasonic wave elements is an ultrasonic wave transmission element and is attached to the outer wall of the pipeline so that an ultrasonic wave transmission surface thereof is in parallel to a pipe axis direction of the pipeline, and
   another at least one of the ultrasonic wave elements is an ultrasonic wave reception element and is attached to the outer wall of the pipeline so that an ultrasonic wave reception surface thereof is in parallel to the pipe axis direction of the pipeline,
   wherein
   the ultrasonic wave transmission element and two ultrasonic wave reception elements disposed to sandwich the ultrasonic wave transmission element are disposed in the pipe axis direction.

2. The ultrasonic flowmeter according to claim 1, wherein the ultrasonic wave transmission element includes an acoustic lens.

3. The ultrasonic flowmeter according to claim 1, wherein the ultrasonic wave transmission element is a phased array element.

4. The ultrasonic flowmeter according to claim 1, wherein the ultrasonic wave element has flexibility.

5. The ultrasonic flowmeter according to claim 4, wherein the ultrasonic wave reception surface of the ultrasonic wave element is flat.

6. The ultrasonic flowmeter according to claim 1, further comprising an integrating member for fixing a relative positional relation among the plurality of ultrasonic wave elements.

7. An ultrasonic flowmeter comprising a plurality of ultrasonic wave elements attached to an outer wall of a pipeline through which a measurement target fluid flows, and configured to transmit and receive an ultrasonic signal, wherein
   at least one of the ultrasonic wave elements is an ultrasonic wave transmission element and is attached to the outer wall of the pipeline so that an ultrasonic wave transmission surface thereof is in parallel to a pipe axis direction of the pipeline,
   another at least one of the ultrasonic wave elements is an ultrasonic wave reception element and is attached to the outer wall of the pipeline so that an ultrasonic wave reception surface thereof is in parallel to the pipe axis direction of the pipeline, and
   the ultrasonic flow meter further comprises a self-calibration unit configured to calculate a travel distance of the measurement target fluid in the pipe axis direction and sound velocity of the fluid based on the ultrasonic signal traveling in a direction perpendicular to the pipe axis direction of the pipeline.

8. The ultrasonic flowmeter according to claim 7, further comprising a flow rate measurement calculation unit configured to calculate a flow rate of the measurement target fluid using a calculation result of the self-calibration unit.

* * * * *